United States Patent [19]

Nagai et al.

[11] 3,828,239

[45] Aug. 6, 1974

[54] HIGH DC VOLTAGE GENERATING CIRCUIT

[75] Inventors: Tamiji Nagai, Kanagawa-ken; Hiroshi Sahara, Tokyo, both of Japan

[73] Assignee: Sony Corporation, Tokyo, Japan

[22] Filed: Jan. 19, 1973

[21] Appl. No.: 325,150

[30] Foreign Application Priority Data

Jan. 27, 1972 Japan ............................... 47-10145

[52] U.S. Cl. ........... 321/2, 178/7.5 R, 178/DIG. 11, 315/27 TD, 321/15

[51] Int. Cl. .................................. H02m 3/32, H01j

[58] Field of Search ...... 321/2, 2 HF, 15; 315/27 R, 315/27 TD; 178/DIG. 11, 7.5 R; 328/88; 317/16, 49, 61.5

[56] References Cited

UNITED STATES PATENTS

| | | | |
|---|---|---|---|
| 2,929,982 | 3/1960 | Gormley | 321/2 |
| 3,395,313 | 7/1968 | Rogers | 178/DIG. 11 |
| 3,401,272 | 9/1968 | Rosa et al. | 317/61.5 |
| 3,444,424 | 5/1969 | Ushikubo et al. | 315/27 TD |

*Primary Examiner*—William H. Beha, Jr.
*Attorney, Agent, or Firm*—Lewis H. Eslinger, Esq.; Alvin Sinderbrand, Esq.

[57] ABSTRACT

A high DC voltage generating circuit is provided with an impedance element connecting a switching element with the primary winding of a fly-back transformer, and a capacitive element is connected to the primary winding of the fly-back transformer to form a resonance circuit therewith, so that the fly-back transformer delivers, as its output, a sinusoidal high voltage which is subjected to a voltage doubler rectification to provide a high DC voltage with improved regulation.

8 Claims, 19 Drawing Figures

HIGH DC VOLTAGE GENERATING CIRCUIT

BACKGROUND OF THE INVENTION

1. Field of the Invention

This invention relates generally to television receivers, and more particularly to a high DC voltage generating circuit which is used for supplying a high DC voltage to a cathode ray tube of television receivers.

2. Description of the Prior Art

There have been proposed heretofore high DC voltage generating circuits of the pulse converting type for generating the high DC voltage necessary for operation of the cathode ray tubes used in television receivers. The high DC voltage required for this purpose is frequently of the order of 20K volts or more. The conventional high DC voltage generating circuits of the pulse converting type have relatively poor regulation of the output voltage, so that, for example, when the brightness of the television image increases, the increased current flowing from the high voltage supply source to the cathode ray tube of the television receiver has a tendency to reduce the high voltage being generated. Conversely, a reduction in the brightness of the television image causes the high voltage to increase. In either case, variations in the high voltage supplied to the cathode ray tube causes undesirable changes in the size of the television picture displayed on the cathode ray tube.

SUMMARY OF THE INVENTION

It is an object of this invention to provide a high DC voltage generating circuit with good regulation characteristics.

It is another object of this invention to provide a high DC voltage generating circuit suitable for the incorporation therein of multiplier-rectifying.

It is a further object of this invention to provide a high DC voltage generating circuit which can generate the requisite high DC voltage while relatively decreasing the voltage applied to a fly-back transformer and the current passing therethrough.

It is still another object of this invention to provide a high DC voltage generating circuit in which a fly-back transformer of reduced size can be employed.

The above, and other objects, features and advantages of the invention, will be apparent from the following description which is to be read in conjunction with the accompanying drawings.

DESCRIPTION OF THE PREFERRED EMBODIMENTS

Figure 1:
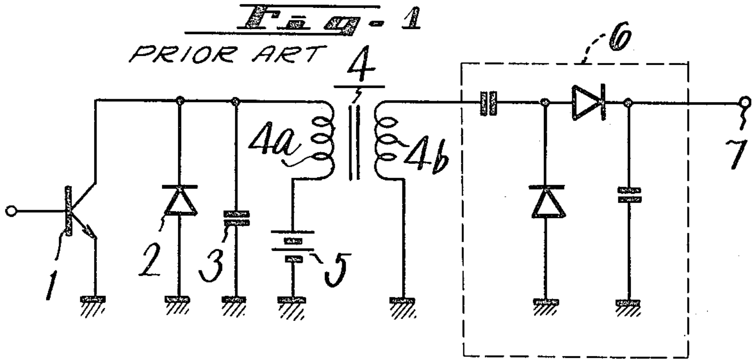
FIG. 1 is a schematic circuit diagram of one example of a high DC voltage generating circuit according to the prior art.
Figure 2:
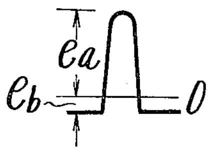
FIG. 2 is a schematic waveform diagram to which reference will be made in explaining the operation of the circuit shown in FIG. 1.

In order to provide a better understanding of this invention, a conventional high DC voltage generating circuit will be now described with reference to FIGS. 1 to 3. In the example of a known high DC voltage generating circuit illustrated in FIG. 1, a switching transistor 1 is directly grounded at its emitter electrode, while its collector electrode is connected to ground through a damper diode 2 and through a capacitor 3. The collector electrode of transistor 1 is further connected through a primary winding 4*a* of a fly-back transformer 4 to a power supply source 5. A voltage doubler rectifying circuit 6 is connected to the secondary winding 4*b* of fly-back transformer 4, and a high DC voltage is derived from an output terminal 7 connected to the output side of voltage doubler rectifying circuit 6. The base electrode of switching transistor 1 is supplied with the driving signal of the horizontal period so as to be turned ON and OFF in accordance with such signal. When transistor 1 is in the ON state, current is supplied thereto from power supply source 5 through the primary winding 4*a* of fly-back transformer 4. Therefore, when transistor 1 is in the OFF state, a high voltage pulse, such as is shown in FIG. 2, is obtained across the secondary winding 4*b* of fly-back transformer 4. The pulse width of this high voltage pulse is determined by suitable selection of the inductance of the primary and secondary windings of fly-back transformer 4 and of the capacitance of capcitor 3, to be 7 to 11 microseconds in the case where one horizontal period is 63.5 micro-seconds, that is to say, the horizontal frequency is 15.75 KHz.

Assuming that the high voltage pulse has a voltage $e_a$ at its plus side and a voltage $e_b$ at its minus side, as shown in FIG. 2, a voltage $2(e_a+e_b)$ is obtained at the output terminal 7.

Figure 3:
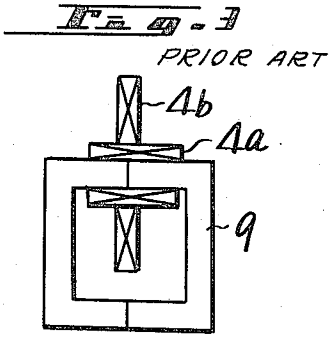
FIG. 3 is a sectional view of a fly-back transformer used in the circuit shown in FIG. 1.

The above described conventional pulse type high DC voltage generating circuit has the following drawbacks:

The time period when the rectifier in the rectifying circuit is conductive, that is, the current conducting angle, is small leading to poor regulation of high DC voltage due to the fact that the pulse width of the high voltage pulse is narrow;

Even if the voltage doubler rectifying circuit 6 is employed, voltage of doubled magnitude cannot be obtained in practice due to the voltage of the high voltage pulse at its minus side being low as compared with that at its plus side;

Since it is necessary that a comparatively large current flow through primary winding 4*a* of fly-back transformer 4, the primary winding 4*a* has to be of large size;

Since a large amount of magnetic flux passes through the core of fly-back transformer 4, a core of large size is required so as to avoid its magnetic saturation;

In order to obtain a sufficient wave height for the high voltage pulse, the pulse width of the high voltage pulse has to be kept less than a predetermined width so that the stray capacity of secondary winding 4*b* of the fly-back transformer 4 has to be limited, as by employing only a small number of turns in each layer of the secondary winding 4*b* wound on a core 9 of the fly-back transformer 4, with the result that the diameter of the secondary winding 4*b* is large as shown on FIG. 3; and In the event that the high DC voltage output terminal is grounded by a spark between the anode of the cathode ray tube and earth the impedance viewed equivalently from the transistor 1 to the primary winding 4*a* of the fly-back transformer 4 is considerably lowered with the result that a large current passes through transistor 1 to damage the latter.

Figure 4:
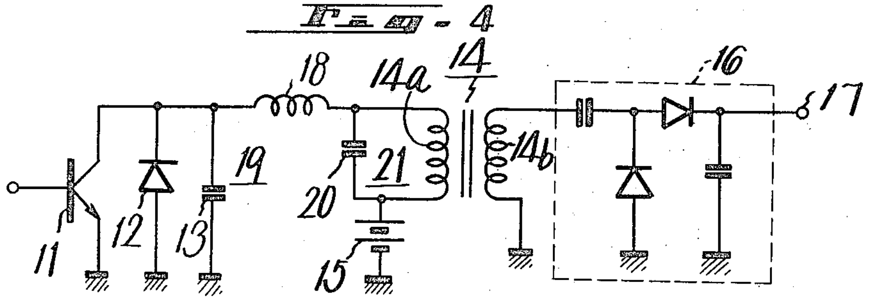
FIG. 4 is a schematic circuit diagram showing a high DC voltage generating circuit according to one embodiment of this invention.
Figures 6A, 6B, 6C, 6D, 6E, 6F, 6G, 6H, 6I:
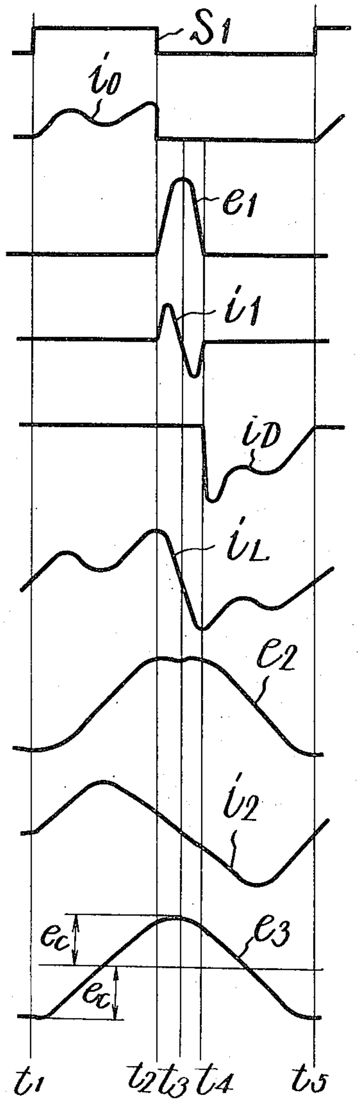
FIGS. 6A through 6I are schematic waveform diagrams to which reference will be made in explaining the operation of the circuit shown in FIG. 4.

An embodiment of a high DC voltage generating circuit according to this invention will now be described with reference to FIG. 4. In the circuit of FIG. 4, a transistor 11 which acts as a switching element has its collector electrode connected with one end of the primary winding 14*a* of a fly-back transformer 14 through an impedance element 18, such as an inductance element, and the other end of primary winding 14*a* is connected to a power supply source 15. The connection point between inductance element 18 and the collector electrode of transistor 11 is connected to ground through a capacitor 13 and through a damper diode 12. Thus, a first resonance circuit 19 is formed by the inductance element 18 and the capacitor 13. A second capacitor 20 is connected to fly-back transformer 14 at its primary winding 14*a* to form a parallel resonance circuit 21 or its equivalent. In the illustrated example, second capacitor 20 is connected in parallel with primary winding 14*a* of transformer 14 to form parallel resonance circuit 21. In this case, the resonance frequency of first resonance circuit 19 is selected, irrespective of the resonance frequency of parallel resonance circuit 21, to obtain a sinusoidal waveform high voltage $e_3$ (FIG. 6I) across the both terminals of parallel resonance circuit 21, and hence across the secondary winding 14*b* of fly-back transformer 14. The obtained sinusoidal waveform high voltage is fed to a voltage doubler rectifying circuit 16 to be rectified therein, and a high DC voltage is derived from circuit 16 at an output terminal 17.

Figure 5:
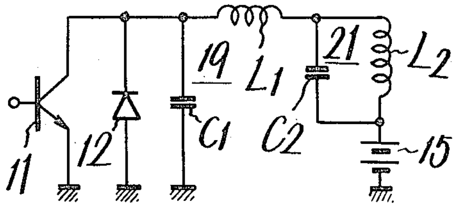
FIG. 5 is an equivalent circuit of that shown in FIG. 4.

In the equivalent circuit of FIG. 5, $L_1$ designates the inductance of inductance element 18; $C_1$ designates the capacitance of capacitor 13; $L_2$ designates the composite inductance of both the primary and secondary windings 14*a* and 14*b* of fly-back transformer 14 converted to its primary side; and $C_2$ designates the composite capacitance made up of the capacitance of capacitor 20, the capacitance of the secondary winding 14*b* of fly-back transformer 14 and the stray capacity of the rectifying circuit 16 when they are converted to the primary side of the fly-back transformer 14. In the event that an inductance element is connected in parallel with the capacitor 13, the composite inductance of such inductance element and the inductance element 18 is represented by the inductance $L_1$. If the condition $L_1>L_2$ is satisfied and resonance circuit 21 is viewed from resonance circuit 19, then the impedance for the resonance frequency $F_1$ of the circuit 19 is the parallel circuit of $L_2$ and $C_2$, which impedance is very small so that the effect of the parallel resonance circuit 21 can be neglected. On the other hand, when the resonance circuit 19 is viewed from the parallel resonance circuit 21, the impedance for the resonance frequency $F_2$ of circuit 21 is the series circuit of $L_1$ and $C_1$, which impedance is very large so that the effect of the resonance circuit 19 can also be neglected. Accordingly, if the fly-back transformer 14 is viewed from the transistor 11, there exists only the resonance circuit 19, which resonates at the frequency $F_1 = 1/2\pi\sqrt{L_1C_1}$ determined by $L_1$ and $C_1$. If the transistor 11 is viewed from the fly-back transformer 14, there exists only the parallel resonance circuit 21, which resonates at the frequency $F_2 = 1/2\pi\sqrt{L_2C_2}$ with the result that both the resonance circuits 19 and 21 operate independently of each other. In a particular example where $L_1$ is selected greater than $L_2$ ($L_1 > L_2$), $C_1$ and $C_2$ are selected suitably to make the resonance frequencies $F_1$ and $F_2$ about 40 ~ 50KHz and about 15 ~ 20KHz, respectively. Under the foregoing conditions, if the transistor 11 for switching operation is supplied at its base electrode with the driving signal $S_1$ shown on FIG. 6A so as to be made conductive during the time period between the points $t_1$ and $t_2$, a current $i_o$ (FIG. 6B) flows through transistor 11 during such time period from power supply 15 through primary winding 14*a* of fly-back transformer 14, capacitor 20 and inductance element 18. When transistor 11 becomes non-conductive at the point $t_2$, the energy stored in inductance element 18 moves to capacitor 13. At this time, if the capacitor 13 is taken standard across its both ends, the energy stored on capacitor 13 returns to the inductance element 18 at the time point $t_3$ since only the resonance circuit 19 is established, as mentioned above, with the result that a current $i_1$ (FIG. 6D) passes through capacitor 13 and hence a pulse voltage $e_1$ (FIG. 6C) is obtained across the capacitor 13. The pulse width of the pulse voltage $e_1$, or the time interval between the time points $t_2$ and $t_4$, is $1/2F_1$ in which $F_1$ is the resonance frequency of resonance circuit 19. The time period between the points $t_4$ and $t_5$ becomes a so-called damper period during which a damper current $i_D$ (FIG. 6E) flows through the diode 12. Accordingly, a current $i_L$ (FIG. 6F) passes through inductance element 18 during the time period between points $t_1$ and $t_5$. On the other hand, if the parallel resonance circuit 21 is taken as standard, since only the resonance circuit 21 is established and its resonance frequency is selected to be substantially equal to the horizontal frequency, a resonance voltage $e_2$ (FIG. 6G) and a resonance current $i_2$ (FIG. 6H) of substantially sinusoidal waveform which has one cycle during the time period between the points $t_1$ and $t_5$, are obtained from the resonance circuit 21, irrespective of the pulse voltage $e_1$ derived from resonance circuit 19. As a result, from the secondary winding 14*b* of the fly-back transformer 14 an output voltage $e_3$ (FIG. 6I) of substantially sinusoidal wave is obtained, which is then voltage-doubler-rectified by the rectifying circuit 16 and delivered to the output terminal 17 as a predetermined high DC voltage. In this case the conducting angle of the output voltage $e_3$ is determined by the resonance frequency $f_2$.

Figure 7:
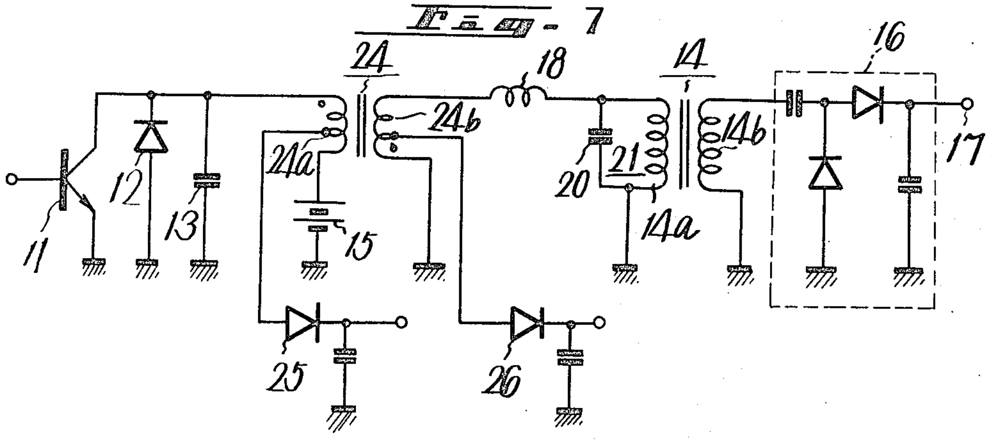
FIGS. 7 and 8 are schematic circuit diagrams showing other embodiments of this invention.
Figure 8:
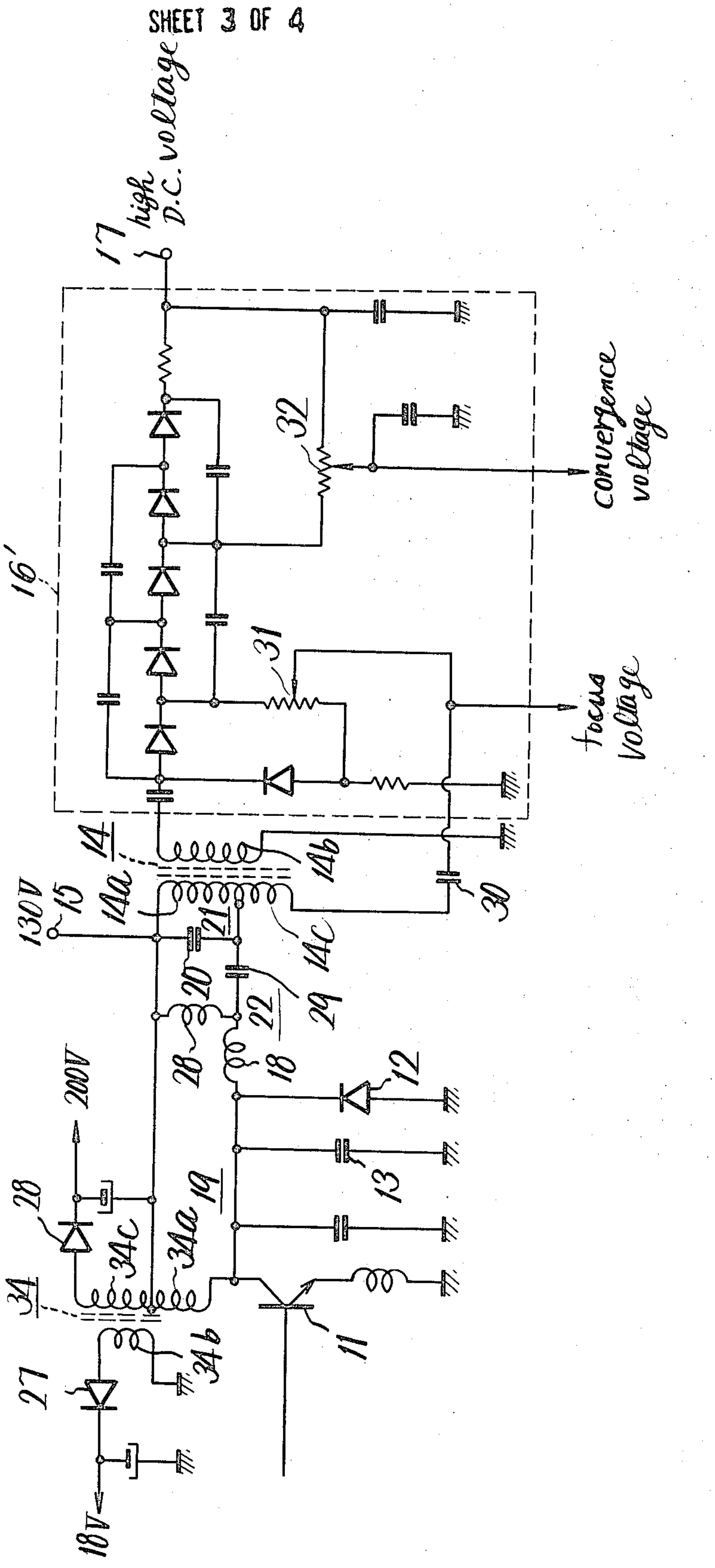

Further, in circuits according to this invention, since the pulse voltage $e_1$ is obtained across capacitor 13, a low voltage may also be provided by rectifying the thus obtained pulse voltage $e_1$, for example, as shown in FIGS. 7 and 8, in which circuit elements corresponding to those described above with reference to FIG. 4 are identified by the same reference numerals.

In the embodiment of FIG. 7, a transformer 24 is provided in addition to the fly-back transformer 14, and the power supply 15 is connected through the primary winding 24*a* of transformer 24 to the collector electrode of transistor 11 and the inductance element 18 is inserted between the secondary winding 24*b* of transformer 24 and the primary winding 14*a* of fly-back transformer 14. Taps are provided on the primary and secondary windings 24*a* and 24*b* of transformer 24, and pulse voltages of opposite polarities are obtained at the taps on windings 24*a* and 24*b* and then fed to diodes 25 and 26 to be rectified as different low DC voltages.

In the embodiment of FIG. 8, a transformer 34 is provided in addition to the fly-back transformer 14, and, in this case, the power supply 15 of 130 volts is connected to the collector electrode of transistor 11 through the primary winding 34*a* of transformer 34. The transformer 34 has secondary and tertiary windings 34*b* and 34*c* from which pulse voltages of opposite polarities are obtained, and the thus obtained pulse voltages of opposite polarities are respectively fed to diodes 27 and 28 to be rectified for providing different low DC voltages. A series circuit of the inductance element 18 and a capacitor 29 is connected between the primary winding 14*a* of fly-back transformer 14 and the collector electrode of transistor 11. A saturable reactor 28 is connected between power supply 15 and the connection point of the inductance element 18 with the capacitor 29. A voltage multiplier rectifying circuit 16′ comprising six diodes is connected to the secondary winding 14*b* of fly-back transformer 14 in place of the voltage double rectifying circuit 16 employed in the embodiments of FIGS. 4 and 7. The rectifying circuit 16′ further comprises variable resistors 31 and 32 for adjusting the focus voltage and the convergence voltage, respectively, which may be derived from circuit 16′ in addition to the high DC voltage at terminal 17. The fly-back transformer 14 used in the embodiment of FIG. 8 further comprises a tertiary winding 14*c* from which a substantially sinusoidal waveform voltage is derived, and such voltage is added through a capacitor 30 to the static focus voltage derived from the variable resistor 31 to provide the dynamic focus.

Figure 9:
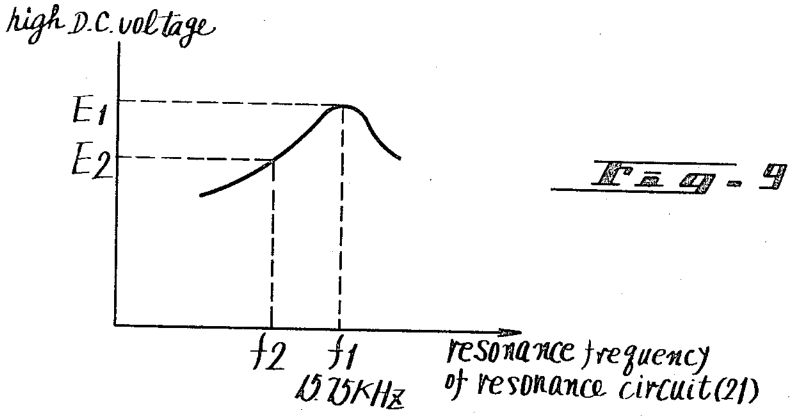
FIGS. 9 and 10 are graphs to which reference will be made in explaining the operation of the circuit depicted in FIG. 8.

The resonance frequency of the parallel resonance circuit 21 is determined by the inductance of the primary winding 14*a* of transformer 14 and the capacitance of capacitor 20 and, in a preferred example, is selected to be about 19KHz. The reason is as follows: If the resonance frequency of resonance circuit 21 is selected to be equal to the horizontal frequency (15.75KHz) indicated at $f_1$ on FIG. 9, the high DC voltage derived from output terminal 17 becomes the maximum designated at $E_1$ on FIG. 9. However, if a load current flows through rectifying circuit 16′, the output high DC voltage is lowered due to the internal impedance of rectifying circuit 16′ and hence the resonance frequency of resonance circuit 21 is equivalently lowered to $f_2$ with the result that the high DC voltage is also lowered to the value $E_2$, as shown in FIG. 9. In other words, regulation of the high DC voltage tends to be deteriorated.

Figure 10:
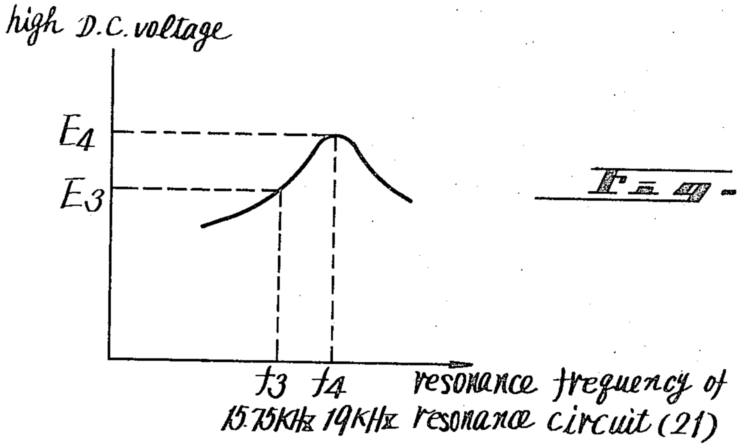

On the other hand, if the resonance frequency of resonance circuit 21 is selected to be 19 KHz, as indicated at $f_4$ on FIG. 10, the high DC voltage output is $E_3$ at the horizontal frequency (15.75KHz) indicated at $f_3$. When a load current flows through rectifying circuit 16′, the high DC voltage has a tendency to be lowered due to the internal impedance of the rectifying circuit 16′. At this time, however, the resonance frequency of resonance circuit 21 is lowered toward $f_3$ (15.75KHz) from $f_4$ (19KHz), so that the high DC voltage tends to be increased with the result that the output high DC voltage at terminal 17 is not varied. Thus, the output high DC voltage is not varied by the variation of the load current, and improved regulation of high DC voltage results.

Further, even if no load current flows through the rectifying circuit 16′ and the frequency of the driving signal for the transistor 11 is varied to be about 19KHz, the high DC voltage may not attain the abnormal state $E_4$ on FIG. 10 to cause damage to the rectifying circuit 16′.

More specifically, the series circuit consisting of inductance element 18 and capacitor 29, which is inserted between the primary winding 14*a* of fly-back transformer 14 and transistor 11 and forms a series resonance circuit 22, acts to avoid such damage. In the described example, the resonance frequency of series resonance circuit 22 is selected to be about 14KHz. Accordingly, the energy supplied to fly-back transformer 14 from transitor 11 attains the maximum in the vicinity of the frequency of 14 KHz, so that the high DC voltage is not abnormally increased even if the frequency of the driving signal for transistor 11 is unduly increased, for example, to 19KHz.

Further, in the embodiment of FIG. 8, the saturable reactor 28 connected between power supply 15 and the connection point of inductance element 18 with capacitor 29 acts to prevent damage to transistor 11 in the event of sparking of the high DC voltage. More specifically, when the high DC voltage sparks, the inductance of saturable reactor 28 becomes very small due to the fact that a great amount of current flows through the saturable reactor 28 to equivalently short-circuit both ends of the primary winding 14*a* of fly-back transformer 14. As a result, no high DC voltage appears at the output terminal 17, and hence sparking of the high DC voltage is interrupted to prevent the continuous flow of a great current through transistor 11 and thereby protect the latter.

It will be apparent that in the circuits according to this invention, since a high DC voltage is obtained by rectifying a sinusoidal waveform high voltage, the current conducting angle in the rectifier used in the rectifying circuit is large with the result that regulation of the high DC voltage is improved.

Further, if a voltage multiplier rectifying circuit is used as the rectifying circuit, as in FIG. 8, since an input voltage fed to the rectifying circuit is of sinusoidal waveform, voltage-multiplier-rectifying is completely achieved for the input voltage. As a result, a sufficiently high DC voltage can be obtained even if the input voltage is relatively small.

In the circuits according to this invention, a relatively low current flows through the primary winding of the fly-back transformer, so that such winding can be small in size, and a correspondingly small amount of magnetic flux passes through the core of the fly-back transformer so that magnetic saturation of the core need not be feared with the result that a core of small size can be used in the fly-back transformer.

Figure 11:
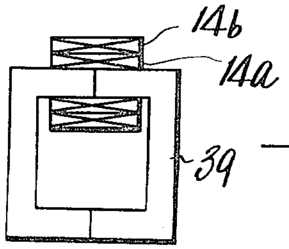
FIG. 11 is a sectional view of a fly-back transformer used in the circuit shown in FIG. 8.

Since in accordance with this invention the parallel resonance circuit equivalently formed at the primary side of the fly-back transformer is selected to have a relatively low resonance frequency, for example, about 15.75KHz, the fly-back transformer can have a great stray capacity. As a result, a large number of turns can be provided in each layer of the secondary winding on the core 39 to reduce the diameter of the secondary winding 14b and hence to reduce the size of the fly-back transformer, as shown on FIG. 11.

In addition, since a relatively low voltage is induced in the secondary winding of the fly-back transformer, a transformer capable of withstanding only relatively low voltages can be used as the fly-back transformer in circuits according to this invention.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A high DC voltage generating circuit comprising:

a switching element driven by a recurrent signal,
a transformer having at least primary and secondary windings,
reactive impedance means through which said primary winding of the transformer is electrically connected to said switching element,
a capacitive element coupled to said primary winding of the transformer and forming, with said primary winding, a resonance circuit of a predetermined frequency for producing a substantially sinusoidal wave voltage at said secondary winding of the transformer, and
rectifier means connected to said secondary winding of the transformer for rectifying said substantially sinusoidal wave voltage to produce a high DC voltage.

2. A high DC voltage generating circuit comprising:

a switching element driven by a recurrent signal,
a transformer having at least primary and secondary windings,
an impedance element through which said primary winding of the transformer is electrically connected to said switching element, said impedance element comprising a series resonance circuit,
a capacitive element coupled to said primary winding of the transformer and forming, with said primary winding, a resonance circuit of a predetermined frequency for producing a substantially sinusoidal wave voltage at said secondary winding of the transformer, and
rectifier means connected to said secondary winding of the transformer for rectifying said substantially sinusoidal wave voltage to produce a high DC voltage.

3. A high DC voltage generating circuit comprising:

a switching element driven by a recurrent signal,
a transformer having at least primary and secondary windings,
an impedance element through which said primary winding of the transformer is electrically connected to said switching element, said impedance element comprising an inductive element,
a capacitive element coupled to said primary winding of the transformer and forming, with said primary winding, a resonance circuit of a predetermined frequency for producing a substantially sinusoidal wave voltage at said secondary winding of the transformer, and
rectifier means connected to said secondary winding of the transformer for rectifying said substantially sinusoidal wave voltage to produce a high DC voltage.

4. A high DC voltage generating circuit according to claim 3, further comprising means forming an additional resonance circuit connected to said switching element for producing a pulse voltage at the output side of said switching element.

5. A high DC voltage generating circuit according to claim 4, wherein said additional resonance circuit includes said inductive element.

6. A high DC voltage generating circuit according to claim 4, wherein said inductive element is operative to isolate said resonance circuit formed by the capacitive element and said primary winding of the transformer from said additional resonance circuit.

7. A high DC voltage generating circuit according to claim 1, wherein said rectifier means comprises a voltage multiplier rectifying circuit.

8. A high DC voltage generating circuit according to claim 1, wherein a saturable reactor is connected in parallel to said resonance circuit.

* * * * *